(12) United States Patent
Hawley

(10) Patent No.: US 10,549,747 B2
(45) Date of Patent: Feb. 4, 2020

(54) PARALLEL HYBRID VEHICLE LAUNCH TORQUE CONTROL

(71) Applicant: Toyota Motor Engineering & Manufacturing North America, Inc., Plano, TX (US)

(72) Inventor: Thomas S. Hawley, Ann Arbor, MI (US)

(73) Assignee: TOYOTA MOTOR ENGINEERING & MANUFACTURING NORTH AMERICA, INC., Plano, TX (US)

(*) Notice: Subject to any disclaimer, the term of this patent is extended or adjusted under 35 U.S.C. 154(b) by 29 days.

(21) Appl. No.: 15/669,686

(22) Filed: Aug. 4, 2017

(65) Prior Publication Data
US 2019/0039599 A1 Feb. 7, 2019

(51) Int. Cl.
| B60W 20/40 | (2016.01) |
| B60W 10/06 | (2006.01) |
| B60W 10/08 | (2006.01) |
| B60W 30/192 | (2012.01) |
| B60L 53/24 | (2019.01) |

(52) U.S. Cl.
CPC ............ B60W 20/40 (2013.01); B60L 53/24 (2019.02); B60W 10/06 (2013.01); B60W 10/08 (2013.01); B60W 30/192 (2013.01); B60W 2510/18 (2013.01); B60W 2520/00 (2013.01); B60W 2710/0666 (2013.01); B60W 2710/083 (2013.01); B60W 2710/242 (2013.01); B60W 2720/40 (2013.01); Y10S 903/905 (2013.01); Y10S 903/906 (2013.01); Y10S 903/93 (2013.01)

(58) Field of Classification Search
None
See application file for complete search history.

(56) References Cited

U.S. PATENT DOCUMENTS

| 5,944,630 | A | 8/1999 | Omote | |
| 7,628,728 | B2 | 12/2009 | Soliman | |
| 2013/0297126 | A1* | 11/2013 | Yamazaki | B60W 20/40 701/22 |
| 2013/0311055 | A1* | 11/2013 | Whitney | B60W 30/18027 701/54 |
| 2014/0257609 | A1* | 9/2014 | Dufford | B60W 10/06 701/22 |
| 2015/0266479 | A1* | 9/2015 | Blakeway | B60W 10/06 477/92 |
| 2016/0121877 | A1 | 5/2016 | Hancock | |

* cited by examiner

Primary Examiner — Adam D Tissot
(74) Attorney, Agent, or Firm — Sheppard, Mullin, Richter & Hampton LLP; Hector A. Agdeppa; Daniel N. Yannuzzi

(57) ABSTRACT

System and methods are provided for improving launch performance of a hybrid vehicle. During a stall condition prior to launch, the engine of the hybrid vehicle can produce engine torque beyond a standard stall torque limit. Negative motor torque that offsets the increase in engine torque in accordance with the standard stall torque limit is produced by the motor. This results in loading the automatic transmission of the hybrid vehicle with additional torque that would otherwise not be possible. During a launch condition following the stall condition, the motor torque is dropped to 0 Nm, and the brakes are released, allowing the hybrid vehicle to accelerate. The full torque generated by the engine is provided to the automatic transmission and used to drive one or more wheels of the hybrid vehicle.

20 Claims, 5 Drawing Sheets

```
┌─────────────────────────────────────────────────────────┐
│   CALCULATE BRAKE TORQUE REQUESTED AT ONE OR MORE WHEELS │
│                      OF A VEHICLE                        │
│                                                          │
│                          400                             │
└─────────────────────────────────────────────────────────┘
                             │
                             ▼
┌─────────────────────────────────────────────────────────┐
│   SET DESIRED TURBINE TORQUE TO MATCH THE BRAKE TORQUE   │
│   REQUESTED AT THE ONE OR MORE WHEELS OF THE VEHICLE     │
│                          402                             │
└─────────────────────────────────────────────────────────┘
                             │
                             ▼
┌─────────────────────────────────────────────────────────┐
│   OPERATE ENGINE OF THE VEHICLE TO INCREASE ENGINE TORQUE│
│                                                          │
│                          404                             │
└─────────────────────────────────────────────────────────┘
                             │
                             ▼
┌─────────────────────────────────────────────────────────┐
│  OPERATE MOTOR OF THE VEHICLE TO OFFSET THE INCREASE IN  │
│  ENGINE TORQUE SUCH THAT COMBINED TORQUE OF THE MOTOR AND│
│  ENGINE DURING A STALL CONDITION REMAINS BELOW THE BRAKE │
│                         TORQUE                           │
│                                                          │
│                          404                             │
└─────────────────────────────────────────────────────────┘
```

FIG. 4

PARALLEL HYBRID VEHICLE LAUNCH TORQUE CONTROL

TECHNICAL FIELD

The present disclosure relates generally to controlling torque in a hybrid vehicle. In some embodiments, increased engine torque may be generated to provide greater performance during launch.

DESCRIPTION OF RELATED ART

Hybrid vehicles have become increasingly popular among consumers concerned with their environmental impact and with increasing fuel economy. Hybrid vehicles generally utilize an engine, e.g., an internal combustion engine, along with an electric motor, which can also operate as a generator to provide energy to a battery that powers the electric motor. Hybrid vehicles can use an engine clutch that connects/disconnects the engine to/from a drivetrain. The drivetrain can include the engine and electric motor, and an automatic transmission coupled to the electric motor for transmitting power from the engine, electric motor, or both.

Stall torque techniques are used by drivers of conventional vehicles to improve acceleration performance from a stop condition, for example, to get the shortest 0-60 mph/0-100 kph times that the conventional vehicle is capable of achieving. With a conventional vehicle, a driver depresses the brake pedal to engage the wheel brakes keeping the conventional vehicle from moving, while simultaneously depressing the accelerator pedal to build engine speed and increase torque. Generally, a torque converter allows slippage to occur between the engine and wheels of a conventional vehicle until maximum torque multiplication (referred to as stall ratio) is reached. When the driver releases the brake pedal, the conventional vehicle accelerates under higher torque than would be possible under a normal start condition, where torque has not been built up during the stall condition.

BRIEF SUMMARY OF THE DISCLOSURE

In accordance with some embodiments, a method may comprise determining whether a vehicle is in a stall condition. The method may further comprise generating engine torque exceeding a stall torque limit, and generating negative motor torque to offset a portion of the engine torque exceeding the stall torque limit upon determining the vehicle is in the stall condition. Further still, the method may comprise determining whether the vehicle is in a launch condition. The negative motor torque may be dropped to zero torque, and the generated engine torque may be delivered to a transmission of the vehicle upon determining that the vehicle is in the launch condition.

In some aspects, the portion of the engine torque exceeding the stall torque limit is a function of the negative motor torque. The amount of torque comprising the portion of the engine torque exceeding the stall torque limit may be equivalent to an amount of torque comprising the negative motor torque.

In some aspects, the negative motor torque can be used to regeneratively charge a battery of the vehicle. In some embodiments, the vehicle comprises a parallel hybrid vehicle.

In some aspects, the amount of the engine torque generated and an amount of the negative motor torque generated amounts to turbine torque of a torque converter that does not exceed a brake torque requested at one or more wheels of the vehicle. The turbine torque may be a function of total torque made up of the engine torque and the negative motor torque, and a torque multiplication factor of the torque converter.

In some aspects, a combined torque comprising the engine torque and the negative motor torque does not overpower friction brakes of the vehicle.

In some embodiments, the method may further comprise engaging a clutch to connect an engine of the vehicle generating the engine torque to a drivetrain of the vehicle upon determining that the vehicle is in the launch condition.

In some embodiments, the method may further comprise adjusting the stall torque limit by varying an amount of the negative motor torque generated by a motor of the vehicle.

In accordance with some embodiments, a method may comprise calculating a brake torque requested at one or more wheels of a vehicle, and setting a desired turbine torque to match the brake torque requested at the one or more wheels of the vehicle. In some embodiments, the method may comprise operating an engine of the vehicle to increase engine torque. In some embodiments, the method may further comprise operating a motor of the vehicle to offset the increase in engine torque such that a combined torque of the engine and the motor during a stall condition remains below the brake torque.

In some aspects, the desired turbine torque is a function of the brake torque, gear ratio of one or more friction engagement devices adapted to vary rotational speed of a transmission input shaft connected to a turbine implemented as part of a torque converter of the vehicle, and a differential ratio of a differential gear device connected to the transmission input shaft via an automatic transmission. In some aspects, the desired turbine torque is equal to the combined torque of the engine and the motor multiplied by a torque multiplication factor of the torque converter. In some embodiments, operating the motor to offset the increase in engine torque comprises operating the motor such that torque generated by the motor is negative relative to the engine torque which is positive engine torque. In some aspects, the increase in engine torque is equivalent to an amount of negative torque generated by the motor.

In accordance with another embodiment, a system may comprise: a hybrid vehicle drivetrain comprising an internal combustion engine, and an electric motor operatively connected in parallel to the internal combustion engine. The hybrid vehicle drivetrain may further comprise a torque converter converting power generated from at least one of the internal combustion engine and the electric motor, and delivering the power to an automatic transmission driving one or more wheels of the hybrid vehicle. In some embodiments, the system further comprises an electronic control device. In some embodiments, the electronic control device may, during a stall condition, control the internal combustion engine to generate engine torque. Moreover, the electronic control device may control the electric motor to generate a negative motor torque offsetting a portion of the engine torque exceeding a stall torque limit of the torque converter. In some embodiments, the electronic control device may, during a launch condition following the stall condition, control the electric motor to cease generating negative motor torque, and connect the internal combustion engine to the hybrid vehicle drivetrain to deliver the generated engine torque to the hybrid vehicle drivetrain.

In some aspects, the amount of torque comprising the portion of engine torque exceeding the stall torque limit is equivalent to an amount of torque comprising the negative motor torque generated by the electric motor. In some embodiments, the negative motor torque recharges a battery of the hybrid vehicle having a state of charge such that the battery is capable of receiving regenerative power.

In some embodiments, the electronic control device is adapted to adjust an amount of negative motor torque generated by the electric motor to vary the stall torque limit of the torque converter.

In some aspects, the electronic control device comprises an electronic braking controller adapted to calculate brake torque requested at the one or more wheels of the hybrid vehicle, and operating the internal combustion engine and the electric motor to generate the engine torque and the negative motor torque, respectively, by an amount that does not exceed the requested brake torque.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 4 is a flow chart illustrating example operations that can be performed to set engine and motor torque used to achieve launch torque control in accordance with various embodiments.

The figures are not exhaustive and do not limit the present disclosure to the precise form disclosed.

DETAILED DESCRIPTION

Various embodiments of the present disclosure are directed to controlling torque in a hybrid vehicle, e.g., a parallel hybrid vehicle, during a stall condition to increase torque at launch. Parallel hybrid vehicles can utilize an engine, an electric motor (referred to herein as simply a motor), or both (when coupled) to provide drive power, where the motor and engine may be joined in parallel. As alluded to previously, drivers utilize stall torque techniques to increase acceleration/launch performance from a stop or zero-speed condition. However, performance can be further increased by generating engine torque in excess of a "standard" stall torque limit in a parallel hybrid vehicle.

That is, upon detecting a stall condition, engine torque can be generated to an amount that exceeds a stall torque limit, while the motor generates negative motor torque achieved through changing inverter phase and the direction of a magnetic field applied to the motor. The negative motor torque can offset the excessive engine torque, such that the total or overall torque remains at or below the stall torque limit allowed by a torque converter. During a launch condition following the stall condition, the driver releases the brake pedal while keeping the accelerator pedal depressed, and operation of the motor is ceased. That is, the motor stops generating negative motor torque, dropping the motor torque to zero. The engine may be coupled to the drivetrain to supply its full drive power (which includes that portion of the engine torque exceeding the stall torque limit). As a result, the hybrid vehicle can be launched with increased speed/acceleration. In some embodiments, calculations can be performed in order to better judge the stall condition so that the amount of engine torque that is generated can be adjusted so as not to overpower the brakes. Moreover, in some embodiments, motor torque can be manipulated to allow for adjustment of the stall torque limit, thereby optimizing or further improving launch performance of the hybrid vehicle.

Figure 1:
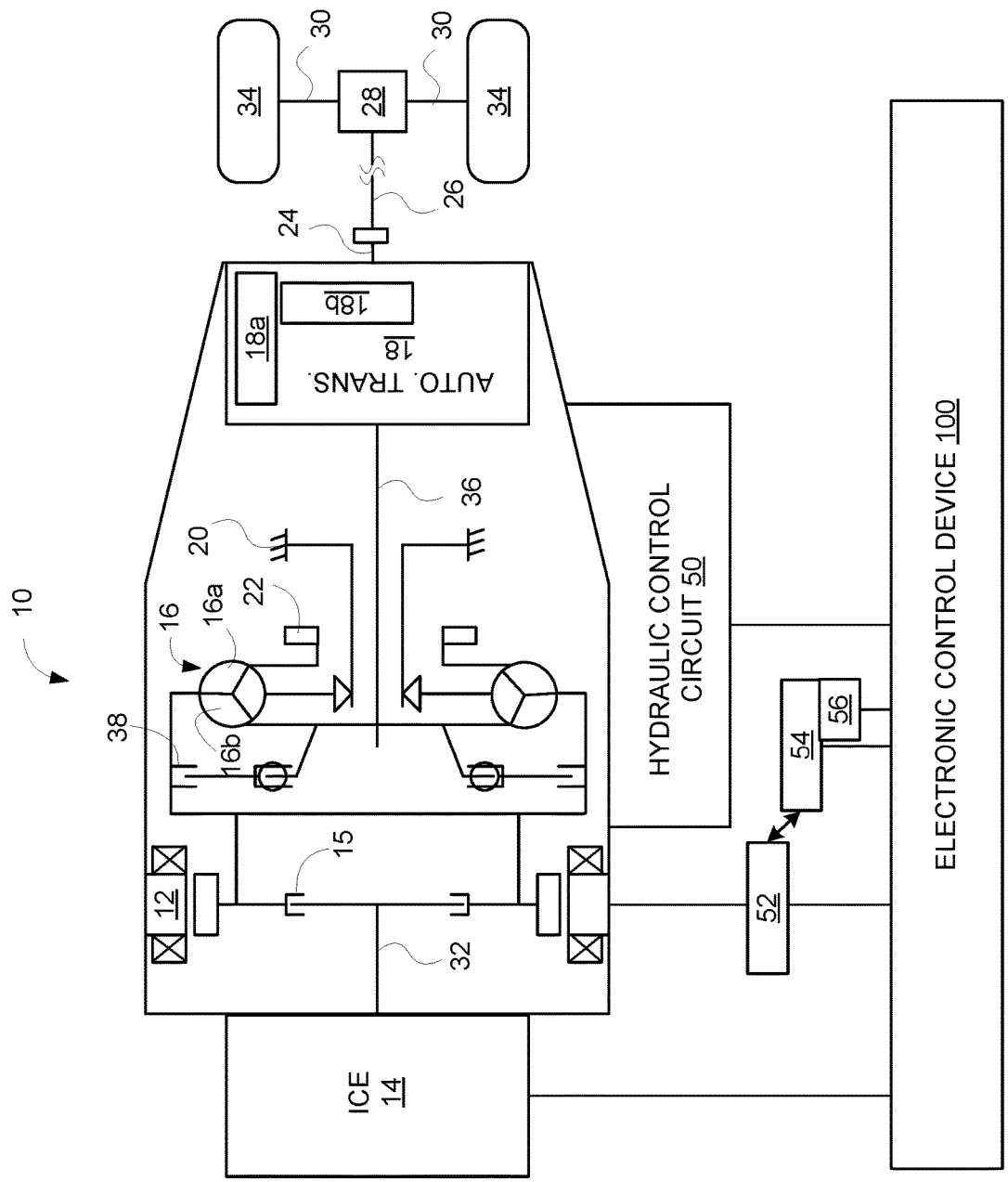
FIG. 1 is a schematic representation of a hybrid vehicle in which launch torque control can be implemented in accordance with various embodiments of the present disclosure.

FIG. 1 is a schematic representation of an example hybrid vehicle 10 in which launch torque control in accordance with various embodiments may be implemented. It should be noted that for clarity of the illustration, not all elements of hybrid vehicle 10 are labeled with a reference numeral. For example, in some cases, only one of two or more elements or components of hybrid vehicle 10 are labeled with a reference numeral. However, it can be assumed that the functionality and/or operation of similarly-illustrated elements or components are the same or substantially similar, unless described otherwise. Moreover, aspects of hybrid vehicle 10 may be described from the perspective of one/one set of elements or components. It can be assumed that secondary instances of those elements or components may operate the same or in a similar manner. It should also be noted that for ease of description and clarity of figures, not all components of a hybrid vehicle have been illustrated, and that the figures and corresponding descriptions are not meant to be limiting. Moreover, a hybrid vehicle may embody certain variations with respect to its elements or components, which are contemplated herein. For example hybrid vehicle 10 may be configured with only a single electric motor.

In particular, FIG. 1 illustrates the general configuration of a drivetrain/power transmission path from an engine 14 and a motor 12 to a pair of drive wheels 34. FIG. 1 further illustrates an example of an electronic control system disposed in hybrid vehicle 10 for output control of engine 14 acting as a drive power source for running, shift control of an automatic transmission 18, drive control of motor 12, etc.

A drivetrain of hybrid vehicle 10 may comprise engine 14, an engine connecting/disconnecting clutch 15, a motor 12, a torque converter 16, an oil pump 22, and the automatic transmission 18, in a transmission case 20. Transmission case 20 acts as a non-rotating member attached to a hybrid vehicle body by bolts, other fasteners, etc. A propeller shaft 26 may be coupled to an output shaft 24 that is an output rotating member of the automatic transmission 18. A differential gear device 28 may be coupled to the propeller shaft 26, and a pair of axles 30 may be coupled to the differential gear device 28. In some embodiments, hybrid vehicle 10 may be a FR (front-engine rear-drive) type, for example.

When engine connecting/disconnecting clutch 15 is engaged, power from engine 14 is transmitted to drive wheels 34. The power is transmitted from an engine coupling shaft 32 through engine connecting/disconnecting clutch 15, torque converter 16, automatic transmission 18, propeller shaft 26, differential gear device 28, and axles 30.

Torque converter 16 may be a hydraulic transmission device transmitting a drive power input to a pump impeller 16a via fluid towards automatic transmission 18. The pump impeller 16a may be coupled sequentially through the engine connecting/disconnecting clutch 15 and the engine coupling shaft 32 to engine 14. Pump impeller 16a may be an input-side rotating element receiving drive power input from engine 14 that is rotatable around an axial center. A turbine impeller 16b of torque converter 16 can be an output-side rotating element of torque converter 16 that is relatively non-rotatably coupled to a transmission input shaft 36 that is an input-side rotating member of the automatic transmission 18. Torque converter 16 may include a lockup clutch 38. The lockup clutch 38 may be a direct clutch disposed between the pump impeller 16a and the turbine impeller 16b and is put into an engaged state, a slip state, or a released state by hydraulic control circuit 50.

Motor 12 may be a motor-generator capable of operating in multiple modes. In one mode, motor 12 may operate as a motor generating mechanical drive power from electrical energy. In another mode, motor 12 may operation as an electric generator generating electric energy from mechanical energy. In other words, motor 12 may act as a drive power source for generating drive power to run hybrid vehicle 10 instead of or in addition to engine 14. Motor 12 may also perform operations such as generating electrical energy through regeneration from drive power generated by engine 14. Motor 12 may also generate electrical energy via driven power (mechanical energy) from drive wheels 34, where the electrical energy may be accumulated in an electrical storage device, e.g., battery 54, via an inverter 52. Motor 12 may be operatively coupled to pump impeller 16a. Power can be mutually transmitted between motor 12 and pump impeller 16a. Therefore, motor 12 is coupled to the transmission input shaft 36 in a power transmittable manner as is the case with the engine 14.

Oil pump 22 may be a mechanical oil pump coupled to the pump impeller 16a and rotationally driven by engine 14 (or motor 12) to generate an operating oil pressure for providing shift control of the automatic transmission 18. Oil pump 22 may control a torque capacity of the lockup clutch 38, control engagement/release of the engine connecting/disconnecting clutch 15, and supply lubricant oil to the portions of the power transmission path of the vehicle 10.

Engine connecting/disconnecting clutch 15 may be a wet multi-plate type hydraulic friction engagement device in which a plurality of overlapping friction plates is pressed by a hydraulic actuator. Accordingly, the plurality of overlapping friction plates can be subjected to engagement/release control by hydraulic control circuit 50 through the use of oil pressure generated by oil pump 22. To control engagement/release of engine connecting/disconnecting clutch 15, a power-transmittable torque capacity of engine connecting/disconnecting clutch 15 is varied. The power-transmittable torque capacity is an engagement force of the engine connecting/disconnecting clutch 15. The variation can occur continuously, for example, through pressure adjustment of a linear solenoid valve in hydraulic control circuit 50. Engine connecting/disconnecting clutch 15 may include a pair of clutch rotating members (a clutch hub and a clutch drum) rotatable relative to each other in a released state. The clutch hub can be non-rotatably coupled to the engine coupling shaft 32 while the clutch drum is non-rotatably coupled to the pump impeller 16a of the torque converter 16. Accordingly, engine connecting/disconnecting clutch 15 rotates the pump impeller 16a with engine 14 via the engine coupling shaft 32 in the engaged state, i.e., drive power from engine 14 is input to the pump impeller 16a. In the released state, power transmission between pump impeller 16a and engine 14 is interrupted. Because motor 12 is operatively coupled to pump impeller 16a, engine connecting/disconnecting clutch 15 acts as a clutch for connecting/disconnecting the drivetrain/power transmission path between the engine 14 and motor 12.

The automatic transmission 18 is coupled to motor 12 without going through the engine connecting/disconnecting clutch 15 in a power transmittable manner. The automatic transmission 18 can be a planetary-gear type multistage transmission. Automatic transmission 18 can be shifted to selectively establish a plurality of shift stages (gear stages) via engagement devices, e.g., hydraulic friction engagement (gripped/released) devices such as brakes 18a and clutches 18b, for example. Automatic transmission 18 can be, for example, a stepped transmission executing a so-called clutch-to-clutch shift to change the speed of the rotation of the transmission input shaft 36 to output the rotation from the transmission output shaft 24. The transmission input shaft 36 can be a turbine shaft rotationally driven by the turbine impeller 16b of the torque converter 16. In automatic transmission 18, the engagement/release control of each of the clutches 18b and the brakes 18a establishes a predetermined gear stage (shift stage) depending on accelerator operation by a driver, vehicle speed, etc.

As noted above, brakes 18a and clutches 18b are hydraulic friction engagement devices frequently used in automatic transmissions and can comprise wet, multi-plate type clutches and brakes that can be engaged by hydraulic actuators, a band brake fastened by a hydraulic actuator, etc. Brakes 18a and clutches 18cb can be subjected to engagement/release control by hydraulic control circuit 50. Thus, respective torque capacities, i.e., engagement forces, are varied through pressure adjustment of a linear solenoid valve in hydraulic control circuit 50, thereby selectively coupling members on the both sides of the engagement devices interposed therebetween.

A torque capacity of an engagement device is determined, for example, by a friction coefficient of the engagement device material and an engagement oil pressure putting pressure on the friction plates. In order to transmit a requested torque at the drive wheels 34 (a transmission input torque on the transmission input shaft 36) without slippage, a torque capacity that is equal to or greater than an assigned torque of the engagement device for the transmission input torque may be required. In this example, a torque capacity of an engagement device may be used synonymously with an engagement oil pressure for convenience. A transmission torque capacity in the automatic transmission 18 is defined as a value acquired by converting a torque capacity of an engagement device into the torque on the transmission input shaft 36.

Hybrid vehicle 10 may further comprise an electronic control device 100 for controlling various aspects of hybrid vehicle 10. For example, electronic control device 100 can provide output control of engine 14, drive control of motor 12, regenerative control of motor 12, and shift control of automatic transmission 18. Electronic control device 100 may further provide torque capacity control of the lockup clutch 38, and torque capacity control of the engine connecting/disconnecting clutch 15. Electronic control device 100 may receive various sensor signals, e.g., signals indicative of the amount of accelerator pedal actuation/accelerator opening, the amount of brake pedal actuation. Other sensor signals may include turbine rotation speed of torque converter 16, transmission input rotation speed (i.e., rotation speed of transmission input shaft 36), transmission output rotation speed (i.e., rotation speed of transmission output shaft 24, which corresponds to vehicle speed). Further still, electronic control device 100 can receive signals indicating rotational speed of motor 12, longitudinal acceleration and/or deceleration, gear selector position, and various operating temperatures. Electronic control device 100 may also receive battery-based signals, e.g., from a battery sensor 56, from which it may calculate a battery state of charge (SOC), e.g., battery temperature, charging/discharging current, and voltage of battery 54.

Electronic control device 100 outputs, for example, an engine output control command signal for the output control of the engine 14, and an electric motor control command signal for controlling the operation of motor 12. Electronic control device 100 may also output command signals, such as an oil pressure command signal for actuating electromagnetic valves (solenoid valves) included in the hydraulic control circuit 50 for controlling the hydraulic actuators of the engine connecting/disconnecting clutch 15, brakes 18a, and clutches 18b.

Figure 2:
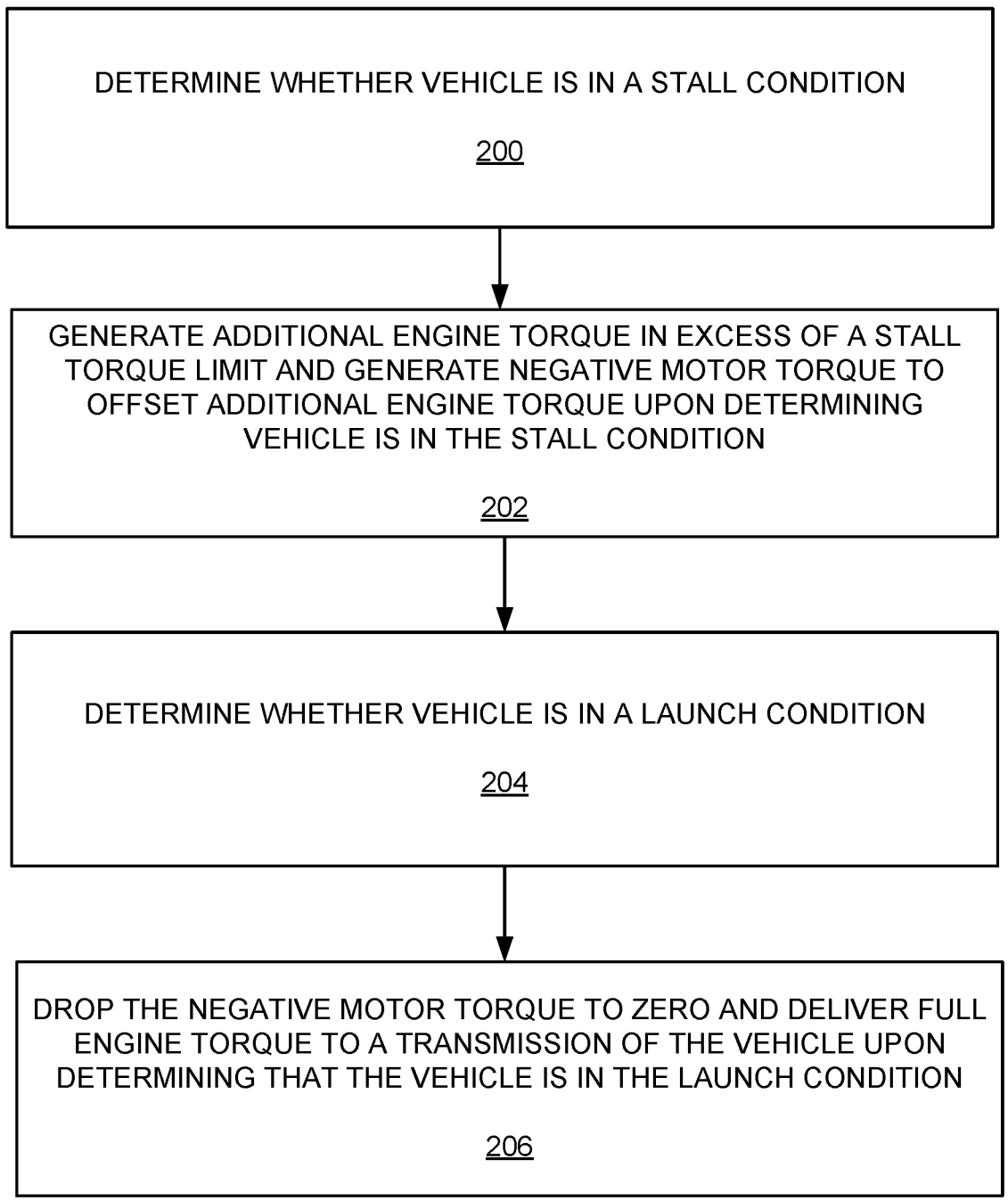
FIG. 2 is a flow chart illustrating example operations that can be performed to control launch torque in accordance with various embodiments of the present disclosure.

FIG. 2 is a flow chart illustrating example operations that can be performed to increase torque during launch of a hybrid vehicle in accordance with various embodiments. At operation 200, it can be determined whether a vehicle is in a stall condition. As described previously, a stall condition can comprise a fully open accelerator and fully engaged brakes and/or a speed of zero. Referring back to FIG. 1, electronic control device 100 may receive or request accelerator and brake sensor signals to determine whether or not hybrid vehicle 10 is in a stall condition. For example, electronic control device 100 may be configured to periodically receive and/or request such sensor signals as a way to monitor the operation status/condition of hybrid vehicle 10. For example, electronic control device 100 may be configured to receive sensor signals upon some threshold-exceeding change/delta from a previously-sensed condition.

At operation 202, upon determining that the vehicle is in the stall condition, engine torque is generated with an engine of the vehicle in excess of a stall torque limit. Additionally, negative motor torque is generated with a motor of the vehicle to offset that portion of the engine torque in excess of the stall torque limit. Referring back to FIG. 1, torque converter 16 may have a stall torque limit depending on the configuration or character of torque converter 16 before the torque generated during the stall condition overpowers the brakes 18a. It should be noted that engine connecting/disconnecting clutch 15 is engaged while hybrid vehicle 10 is in the stall condition, such that engine 14 and motor 12 operate simultaneously, resulting in maximum torque multiplication (stall ratio) at torque converter 16. In accordance with various embodiments, the additional engine torque generated by engine 14 that might otherwise exceed the stall torque limit, is offset by the negative motor torque generated by motor 12. In this way, automatic transmission 18 can be "loaded" with the additional engine torque during the stall condition.

At operation 204, a determination is made to check whether the vehicle is in a launch condition. As described previously, a launch condition can be identified as one in which the accelerator is fully open, and the brakes are disengaged. Referring back to FIG. 1, electronic control device 100 may receive or request accelerator and brake sensor signals to determine whether or not hybrid vehicle 10 is in the launch condition. For example, electronic control device 100 may be configured to periodically receive and/or request such sensor signals as a way to monitor the operation status/condition of hybrid vehicle 10. For example, electronic control device 100 may be configured to receive sensor signals upon some threshold-exceeding change/delta from a previously-sensed condition.

At operation 206, the negative motor torque is dropped to zero, and full engine torque is delivered to a transmission of the vehicle upon determining that the vehicle is in the launch condition. In this way, more power can be transferred to the wheels of the vehicle resulting in better speed/acceleration. Referring back to FIG. 1, electronic control device 100 can instruct inverter 52 to again switch phase and change the direction of the applied magnetic field (opposite from that used to generate negative motor torque. This drops the motor torque to zero. Moreover, engine connecting/disconnecting clutch is engaged to connect engine 14 to the drivetrain allowing power to be delivered to automatic transmission 14.

Figure 3A:
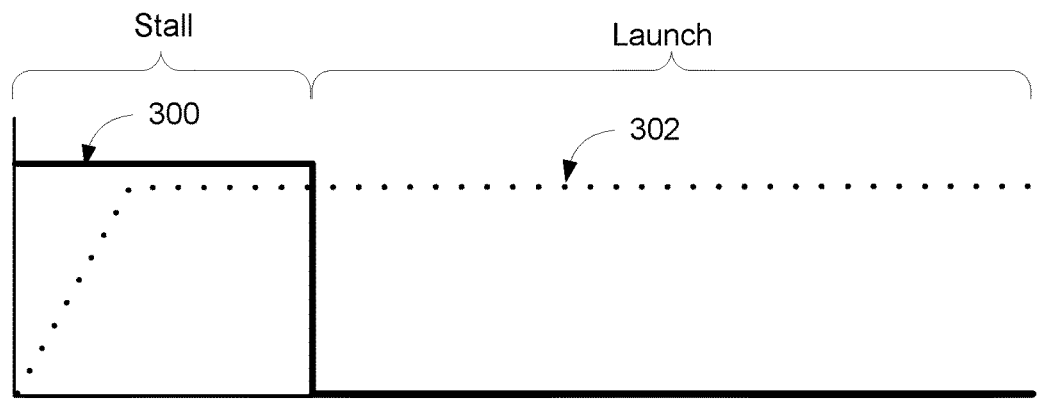
FIG. 3A is a graphical representation of stall and launch conditions.

FIG. 3A is a graphical representation of stall and launch conditions. As described previously, a stall condition can comprise a fully open accelerator and fully engaged brakes. Here, FIG. 3A illustrates a graphical representation of brake sensor signal and a graphical representation of an accelerator sensor signal showing a ramp up in acceleration, and maintaining, e.g., some level of acceleration, in conjunction with the braking. It should be noted that this is merely an example, and that the illustrated amplitudes are not necessarily representative of actual braking/acceleration levels. FIG. 3A also illustrates a launch condition in which the brakes are released or disengaged, while the accelerator is maintained in an open position.

Figure 3B:
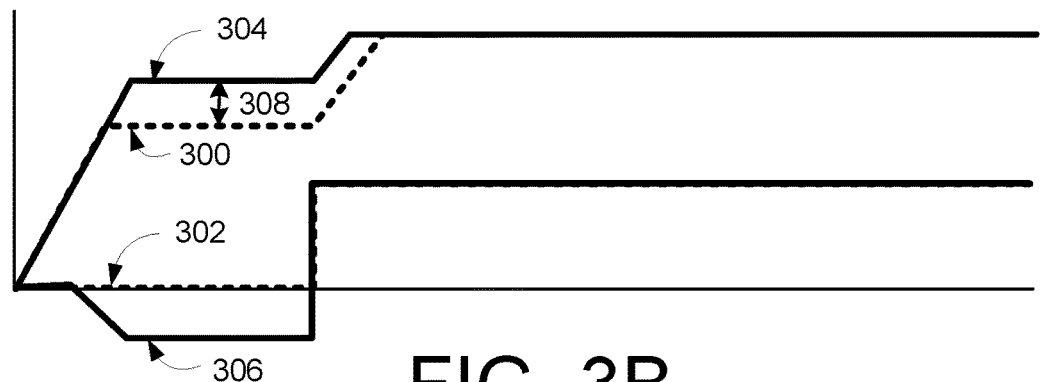
FIG. 3B is a graphical representation of increased engine torque and offset negative motor torque in accordance with various embodiments.

FIG. 3B is a graphical representation of increased engine torque and offset negative motor torque in accordance with various embodiments. As with FIG. 3A, 3B illustrates relative amounts of torque, rather than specific amounts. "Standard" engine torque that would be produced in accordance with a conventional stall torque limit is illustrated by dashed line 300, while "standard" motor torque that could be generated in conjunction with the standard engine torque is illustrated by dashed line 302. In accordance with various embodiments, engine torque can be increased by some amount illustrated as line 304, while negative motor torque illustrated by line 306 offsets the increase in engine torque. The result is a positive delta 308. In some embodiments, the ratio between increased engine torque and negative motor torque may be a 1:1 ratio, i.e., the amount of negative motor torque is equal to that amount of engine torque exceeding the stall torque limit. For example, the stall torque limit of a hybrid vehicle may be 1000 Nm. In accordance with one embodiment, the motor may be operated to generate 250 nm negative motor torque, so that the engine can be operated to generate 250 Nm additional engine torque, resulting in 1250 Nm torque being applied at launch. The 250 Nm of negative motor torque offsets the 250 Nm of engine torque, so that total or overall torque remains at 1000 Nm. In some embodiments, the amount of negative motor torque and the amount of increased engine torque may differ.

Figure 3C:
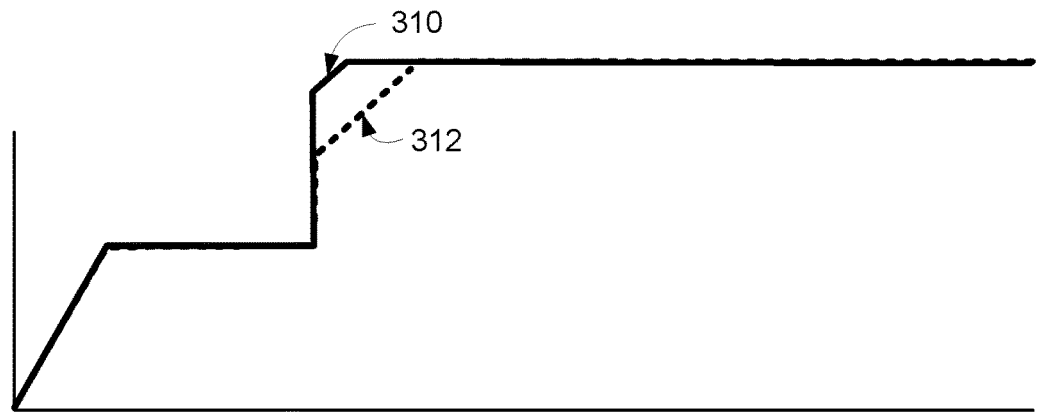
FIG. 3C is a graphical representation comparing conventional turbine torque and increased turbine torque resulting from launch torque control in accordance with various embodiments.

FIG. 3C is a graphical representation comparing conventional turbine torque and increased turbine torque resulting from launch torque control in accordance with various embodiments. Again, the illustrated torques are meant to show relative differences rather than exact amounts or levels of torque. As described previously, it can be appreciated that the conventional stall torque limit is not exceeded due to the negative motor torque offsetting the increased engine torque.

This can be seen in FIG. 3C during the stall condition, where despite the increase in engine torque (304 of FIG. 3B), the turbine torque represented as line 310 remains the same as that of the "standard" turbine torque represented as line 312. However, during launch, FIG. 3C illustrates the resulting increase in turbine torque (compared to the standard turbine torque) due to the increase in engine torque. It should be understood that the turbine torque is the amount of torque generated after the torque converter, i.e., after torque multiplication, and input into the automatic transmission of the hybrid vehicle.

Figure 3D:
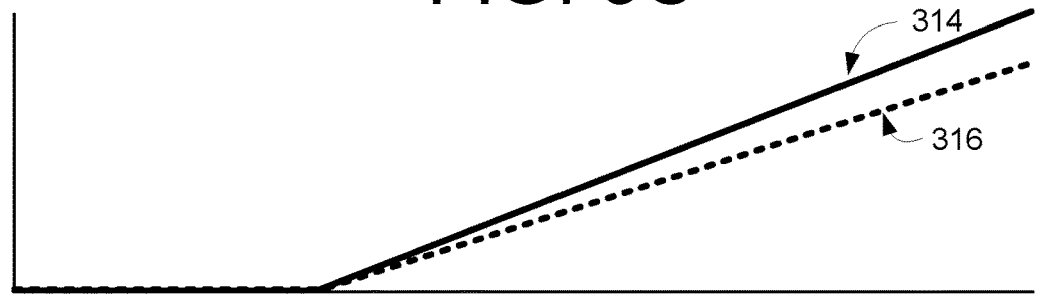
FIG. 3D is a graphical representation comparing conventional vehicle speed with increased vehicle speed resulting from launch torque control in accordance with various embodiments.

FIG. 3D is a graphical representation comparing conventional vehicle speed with increased vehicle speed resulting from launch torque control in accordance with various embodiments. Similar to FIGS. 3A-3C, the illustrated speeds are relative, not any specific indications of speeds. Commensurate with levels of turbine torque illustrated in FIG. 3C, the speed/acceleration of the vehicle 314 resulting from the increase in engine torque is greater than the speed 316 which would be experienced by the vehicle without the increased engine torque.

It should be noted that some methods of controlling torque in hybrid vehicles rely on drivetrains that employ a second clutch rather than a torque converter, e.g., torque converter 16 of hybrid vehicle 10, to apply positive motor torque that also adds to engine torque. In such systems, the amount of increased engine torque is limited by the engine torque/speed that can be maintained, which in turn is directly related to the amount of slip provided by the second clutch, i.e., the heat capacity of such a system. However, due to the use of a torque converter in accordance with various embodiments, slip/heat capacity of a clutch is not a limiting factor.

Moreover, operating a hybrid vehicle in an engine-only mode allows for increased launch performance when the hybrid vehicle is in a low battery SOC. That is, systems that rely on motor torque to supplement engine torque without dropping motor torque to zero upon launch cannot be used in a hybrid vehicle with a low battery SOC. This is because in a low battery SOC state, there would not be enough energy to drive the motor to produce additional torque with which to supplement engine torque. Accordingly, various embodiments improve launch performance of a hybrid vehicle despite being have a low battery SOC. If the hybrid vehicle is equipped with a turbo unit(s), turbo lag may also be reduced due to the increased engine torque. Moreover, the negative motor torque can be used as regenerative energy to charge the battery of the hybrid vehicle. It should be understood that although a relatively large amount of energy may be generated during a stall condition, the energy generated does not last long enough to provide requisite power for launch.

Additionally, engine torque and negative motor torque can be adjusted so as not to overpower the brakes of a hybrid vehicle in accordance with various embodiments. This can be important for safety reasons, for example. In particular, stall conditions can be better judged so that a maximum amount of increased engine torque can be generated.

FIG. 4 is a flow chart illustrating example operations that may be performed to set engine and motor torque used to achieve launch torque control in accordance with various embodiments. For example, at operation 400, brake torque at one or more wheels of a vehicle can be calculated. In some embodiments, referring back to FIG. 1, electronic control device 100 (which may include an electronic brake control functionality) can be used to calculate the torque requested at the pair of wheels 34 of hybrid vehicle 10, represented as $T_{brake}$.

At operation 402, a desired turbine torque is set to match the brake torque requested at one or more wheels of the vehicle. Depending upon the gear ratio (a function of clutches 18b) and the differential ratio (a function of differential gear device 28), torque at the turbine of torque converter 16 can be set to match the requested torque at the one or more wheels. That is, $T_{turbine}=T_{brake}$/gear ratio/differential ratio. The torque multiplication factor can be a factor of engine speed, turbine speed, and torque converter character. Because $T_{turbine}=T_{engine+motor}$*torque multiplication factor, the amount of torque generated by the engine and the amount of negative motor torque generated by the motor can be adjusted to result in $T_{turbine}$, which in turn matches $T_{brake}$.

At operation 404, the engine of the vehicle is operated to increase engine torque and the motor of the vehicle is operated to offset the increase in engine torque such that the combined torque of the engine and the motor during a stall condition remains below the brake torque. That is, the torque at the turbine of torque converter 16 can be set so as not to overpower the brakes 18a of hybrid vehicle 10.

In accordance with yet another embodiment, motor torque can be manipulated such that a stall torque limit of a hybrid vehicle can be adjusted to optimize launch of the hybrid vehicle. That is, and referring back to FIG. 1, the character of torque converter 16 in a conventional hybrid vehicle results in a particular stall torque limit that torque converter 16 settles upon during a stall condition. However, because as previously described, the torque of the motor can be varied, and because torque of the turbine of torque converter 16 is a function of motor torque, the stall torque limit can also be varied.

Figure 5:
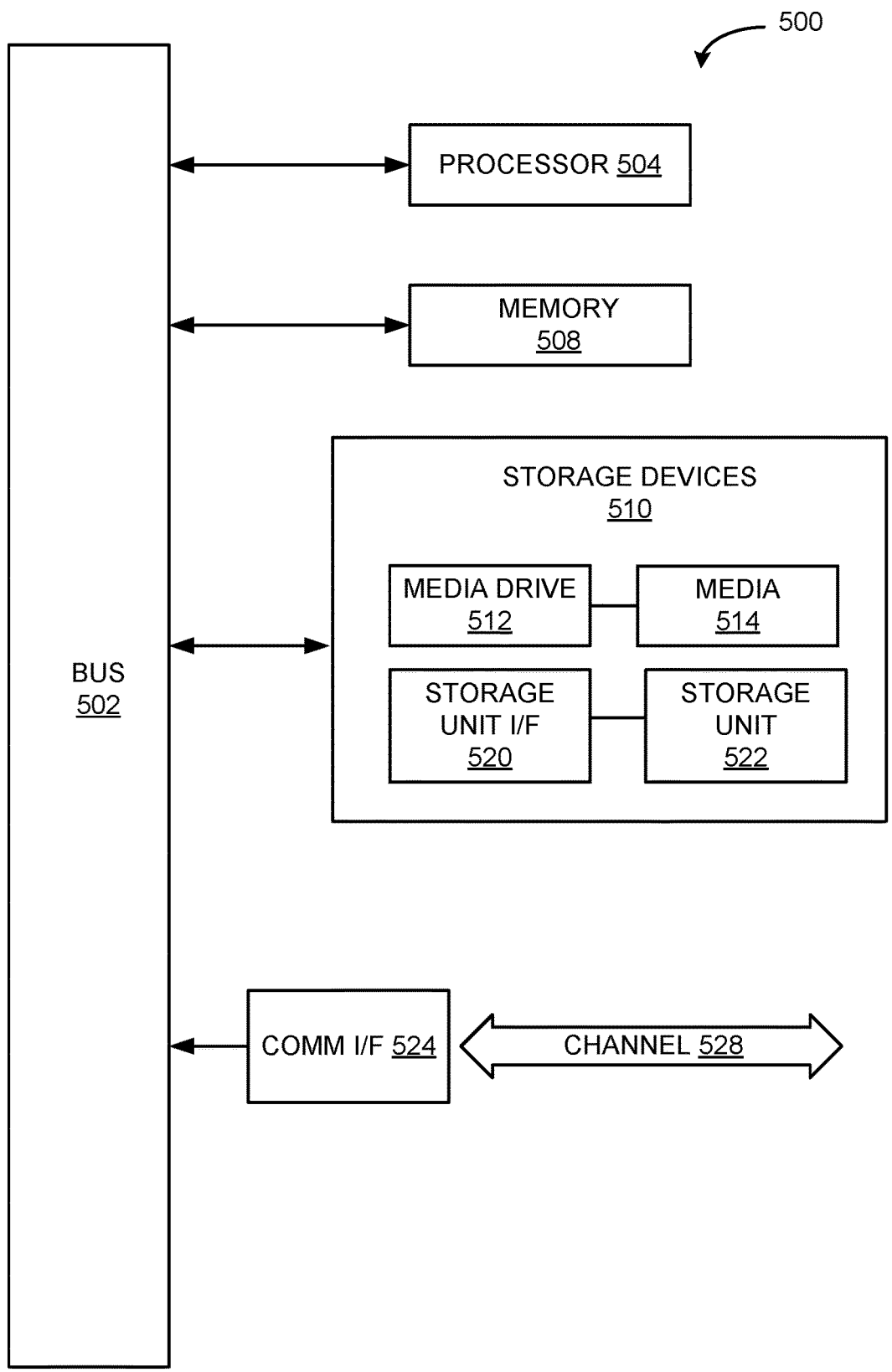
FIG. 5 is an example computing component that may be used to implement various features of embodiments described in the present disclosure.

As used herein, the term component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 5. Various embodiments are described in terms of this example-computing component 500. After reading this description, it will become apparent to a person skilled in the relevant art how to implement the application using other computing components or architectures.

Referring now to FIG. 5, computing component 500 may represent, for example, computing or processing capabilities found within computer processing units or any other type of special-purpose or general-purpose computing devices as may be desirable or appropriate for a given application or environment. Computing component 500 might also represent computing capabilities embedded within or otherwise available to a given device. For example, a computing component might be found in other electronic devices such as, for example, electronic devices that might include some form of processing capability.

Computing component 500 might include, for example, one or more processors, controllers, control components, or other processing devices. This can include a processor, and/or any one or more of the components making up electronic control device 100, hydraulic control circuit 50, or other components or elements of vehicle, e.g., signal sensors, etc. Processor 504 might be implemented using a general-purpose or special-purpose processing engine such as, for example, a microprocessor, controller, or other control logic. Processor 504 may be connected to a bus 502. However, any communication medium can be used to facilitate interaction with other components of computing component 500 or to communicate externally.

Computing component 500 might also include one or more memory components, simply referred to herein as main memory 508. For example, random access memory (RAM) or other dynamic memory, might be used for storing information and instructions to be executed by processor 504. Main memory 508 might also be used for storing temporary variables or other intermediate information during execution of instructions to be executed by processor 504. Computing component 500 might likewise include a read only memory ("ROM") or other static storage device coupled to bus 502 for storing static information and instructions for processor 504.

The computing component 500 might also include one or more various forms of information storage mechanism 510, which might include, for example, a media drive 512 and a storage unit interface 520. The media drive 512 might include a drive or other mechanism to support fixed or removable storage media 514. For example, a hard disk drive, a solid state drive, a magnetic tape drive, an optical drive, a compact disc (CD) or digital video disc (DVD) drive (R or RW), or other removable or fixed media drive might be provided. Storage media 514 might include, for example, a hard disk, an integrated circuit assembly, magnetic tape, cartridge, optical disk, a CD or DVD. Storage media 514 may be any other fixed or removable medium that is read by, written to or accessed by media drive 512. As these examples illustrate, the storage media 514 can include a computer usable storage medium having stored therein computer software or data.

In alternative embodiments, information storage mechanism 510 might include other similar instrumentalities for allowing computer programs or other instructions or data to be loaded into computing component 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory component) and memory slot. Other examples may include a PCMCIA slot and card, and other fixed or removable storage units 522 and interfaces 520 that allow software and data to be transferred from storage unit 522 to computing component 500.

Computing component 500 might also include a communications interface 524. Communications interface 524 might be used to allow software and data to be transferred between computing component 500 and external devices. Examples of communications interface 524 might include a modem or softmodem, a network interface (such as an Ethernet, network interface card, WiMedia, IEEE 802.XX or other interface). Other examples include a communications port (such as for example, a USB port, IR port, RS232 port Bluetooth® interface, or other port), or other communications interface. Software/data transferred via communications interface 524 may be carried on signals, which can be electronic, electromagnetic (which includes optical) or other signals capable of being exchanged by a given communications interface 524. These signals might be provided to communications interface 524 via a channel 528. Channel 528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 508, storage unit 520, media 514, and channel 528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 500 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method for increasing available engine torque prior to launch, comprising:
    determining whether a vehicle is in a stall torque limit condition;
    generating engine torque exceeding a stall torque limit, and generating negative motor torque to offset a portion of the engine torque exceeding the stall torque limit upon determining the vehicle is in the stall torque limit condition;
    determining whether the vehicle is in a launch condition following the stall torque limit condition; and
    dropping the negative motor torque to zero torque, and delivering the generated engine torque to a transmission of the vehicle upon determining that the vehicle is in the launch condition.

2. The method of claim 1 wherein the portion of the engine torque exceeding the stall torque limit is a function of the negative motor torque.

3. The method of claim 2, wherein an amount of torque comprising the portion of the engine torque exceeding the stall torque limit is equivalent to an amount of torque comprising the negative motor torque.

4. The method of claim 1, wherein the negative motor torque is used to regeneratively charge a battery of the vehicle.

5. The method of claim 1, wherein the vehicle comprises a parallel hybrid vehicle.

6. The method of claim 1, wherein an amount of the engine torque generated and an amount of the negative motor torque generated amounts to turbine torque of a torque converter that does not exceed a brake torque requested at one or more wheels of the vehicle.

7. The method of claim 6, wherein the turbine torque is a function of total torque made up of the engine torque and the negative motor torque, and a torque multiplication factor of the torque converter.

8. The method of claim 1, wherein a combined torque comprising the engine torque and the negative motor torque does not overpower friction brakes of the vehicle.

9. The method of claim 1, further comprising engaging a clutch to connect an engine of the vehicle generating the engine torque to a drivetrain of the vehicle upon determining that the vehicle is in the launch condition.

10. The method of claim 1, further comprising adjusting the stall torque limit by varying an amount of the negative motor torque generated by a motor of the vehicle.

11. A method for increasing available engine torque prior to launch, comprising:
    calculating a brake torque requested at one or more wheels of a vehicle;
    setting a desired turbine torque to match the brake torque requested at the one or more wheels of the vehicle;
    operating an engine of the vehicle to increase engine torque; and
    operating a motor of the vehicle to offset the increase in engine torque such that a combined torque of the engine and the motor during a stall torque limit condition remains below the brake torque.

12. The method of claim 11, wherein the desired turbine torque is a function of the brake torque, gear ratio of one or more friction engagement devices adapted to vary rotational speed of a transmission input shaft connected to a turbine implemented as part of a torque converter of the vehicle, and a differential ratio of a differential gear device connected to the transmission input shaft via an automatic transmission.

13. The method of claim 12, wherein the desired turbine torque is equal to the combined torque of the engine and the motor multiplied by a torque multiplication factor of the torque converter.

14. The method of claim 11, wherein operating the motor to offset the increase in engine torque comprises operating the motor such that torque generated by the motor is negative relative to the engine torque which is positive engine torque.

15. The method of claim 11, wherein the increase in engine torque is equivalent to an amount of negative torque generated by the motor.

16. A system for increasing available engine torque prior to launch, comprising:
    a hybrid vehicle drivetrain comprising:
        an internal combustion engine;
        an electric motor operatively connected in parallel to the internal combustion engine; and
        a torque converter converting power generated from at least one of the internal combustion engine and the electric motor, and delivering the power to an automatic transmission driving one or more wheels of the hybrid vehicle; and
    an electronic control device adapted to:
        during a stall torque limit condition, control the internal combustion engine to generate engine torque, and control the electric motor to generate a negative motor torque offsetting a portion of the engine torque exceeding a stall torque limit of the torque converter; and
        during a launch condition following the stall torque limit condition, control the electric motor to cease generating negative motor torque, and connect the internal combustion engine to the hybrid vehicle drivetrain to deliver the generated engine torque to the hybrid vehicle drivetrain.

17. The system of claim 16, wherein an amount of torque comprising the portion of engine torque exceeding the stall torque limit is equivalent to an amount of torque comprising the negative motor torque generated by the electric motor.

18. The system of claim 16, wherein the negative motor torque recharges a battery of the hybrid vehicle having a state of charge such that the battery is capable of receiving regenerative power.

19. The system of claim 16, wherein the electronic control device is adapted to adjust an amount of negative motor torque generated by the electric motor to vary the stall torque limit of the torque converter.

20. The system of claim 16, wherein the electronic control device comprises an electronic braking controller adapted to calculate brake torque requested at the one or more wheels of the hybrid vehicle, and operating the internal combustion engine and the electric motor to generate the engine torque and the negative motor torque, respectively, by an amount that does not exceed the requested brake torque.

* * * * *